United States Patent [19]

Martin et al.

[11] 4,253,497
[45] Mar. 3, 1981

[54] LIVE GAS MAIN INSERTION TOOLS

[76] Inventors: Luther W. Martin, 1221 Julie Dr., Champaign, Ill. 61820; Richard L. Smith, P.O. Box 682, St. Joseph, Ill. 61873

[21] Appl. No.: 66,420

[22] Filed: Aug. 14, 1979

[51] Int. Cl.³ .............................................. F16L 55/18
[52] U.S. Cl. ...................................... 138/97; 405/156
[58] Field of Search ....................... 308/97, 98, 99, 90, 308/93; 405/156, 154, 158

[56] References Cited

U.S. PATENT DOCUMENTS

| | | | |
|---|---|---|---|
| 3,495,626 | 2/1970 | Nagel | 138/97 |
| 3,845,789 | 11/1974 | Rohrer | 138/97 |
| 4,087,219 | 5/1978 | Breitfuss | 405/156 |
| 4,090,534 | 5/1978 | Martin et al. | 138/97 |

*Primary Examiner*—Lenard A. Footland
*Attorney, Agent, or Firm*—Jenkins, Coffey, Hyland, Badger & Conard

[57] ABSTRACT

A pipeline crawler mechanism for increasing the effective length of smaller-diameter gas main which can be inserted into an existing larger-diameter gas main utilizing the techniques described in U.S. Pat. Nos. 3,845,789 and 4,090,534. The mechanism for extending the length of such an insertion includes two self-centering carriers for insertion into the larger-diameter gas main. Each carrier includes an apparatus for attaching a semirigid rod to it so that the carrier may be pushed into the larger-diameter gas main section to a distance determined by the flexibility, weight, etc., of the rod. Each carrier includes a coupler. One coupler includes a male member and the other includes a female member. When the carriers approach each other from opposite ends of the larger-diameter main section upon which an insertion is being conducted, the couplers automatically couple, permitting both carriers and both lengths of the semirigid fiberglass rod to be pulled back toward one end of the larger-diameter main section. Since the length and flexibility of the rod generally determines the maximum length of main section upon which an insertion can be conducted at once, the length of main section upon which an insertion can be conducted at one time is effectively doubled using the crawler.

13 Claims, 4 Drawing Figures

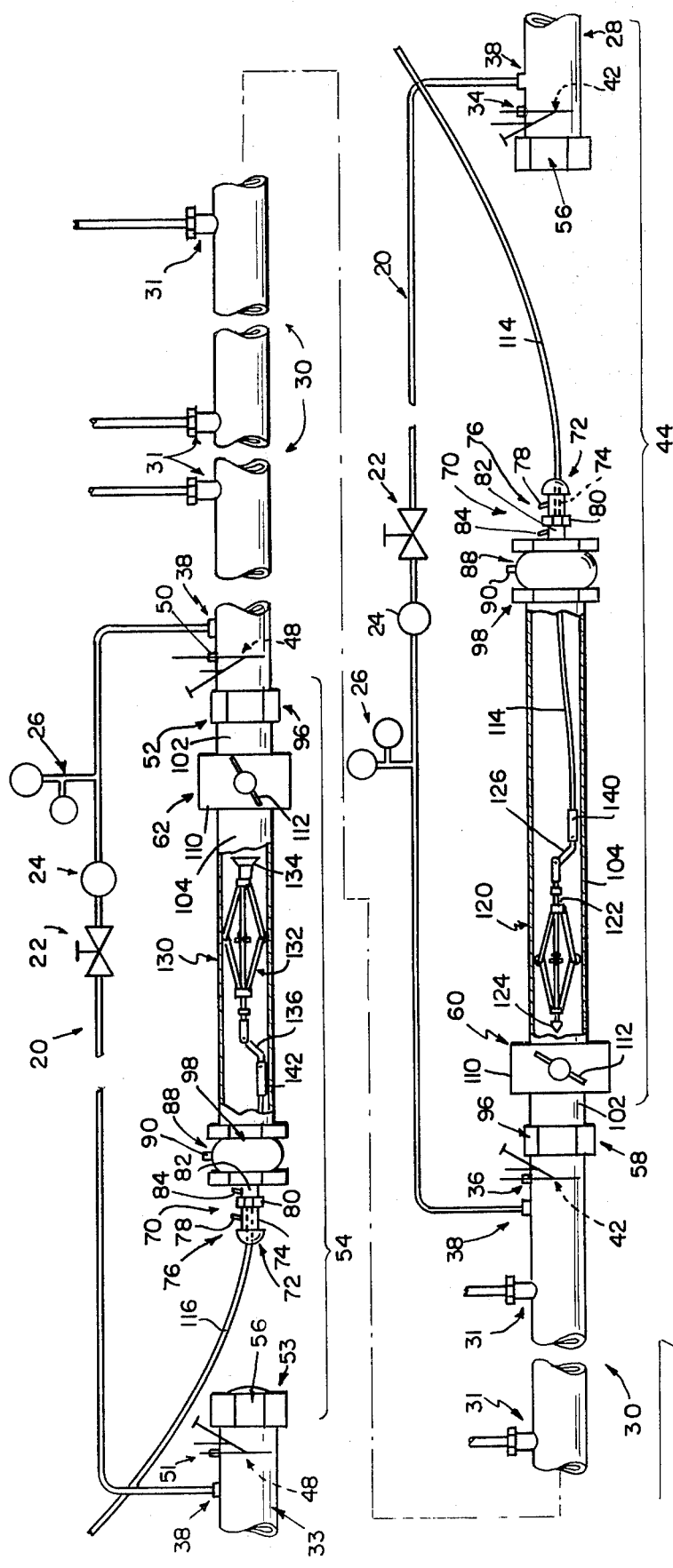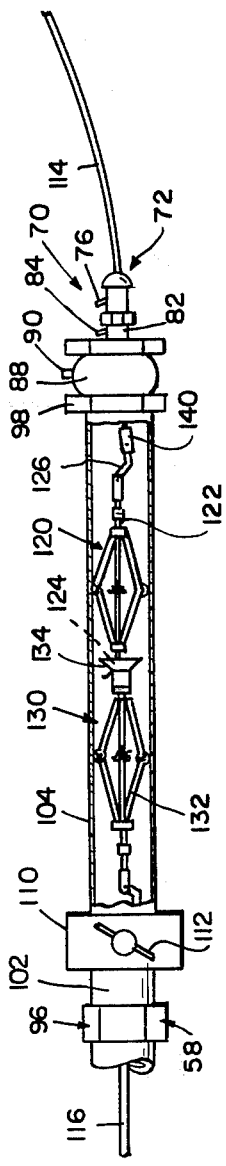
FIG. 1
FIG. 2

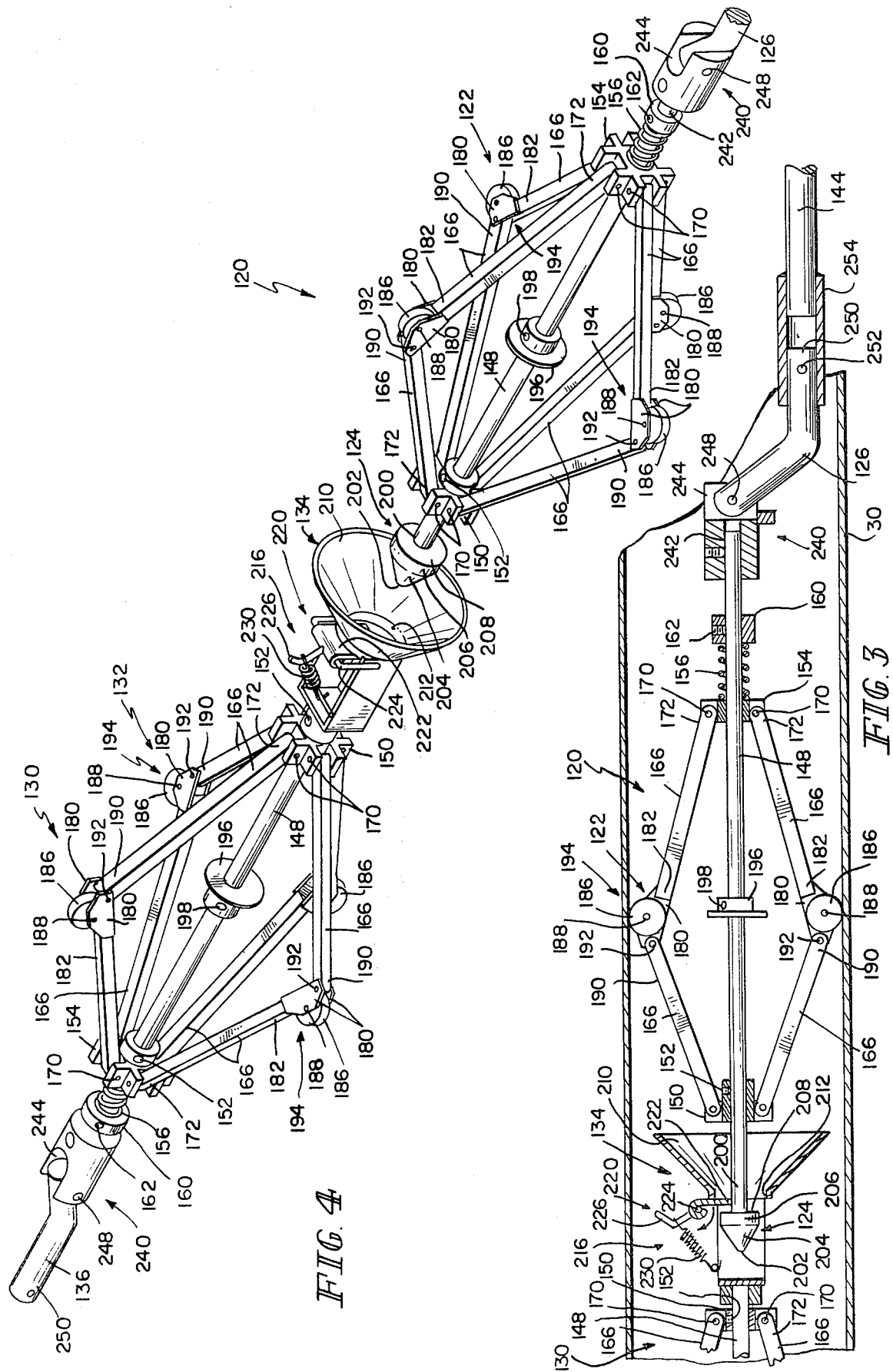

LIVE GAS MAIN INSERTION TOOLS

This invention deals with apparatus for inserting equipment and materials, particularly a smaller-diameter, gas main, into tubes, particularly a larger-diameter gas main, while the larger-diameter gas main remains in service under pressure.

The apparatus of this invention is useful with the methods and apparatus described in considerable detail in the following U.S. Pat. Nos. 3,845,789; 4,090,534.

Heretofore, utilizing the methods described in the above-identified patents, under ordinary conditions, insertions of smaller-diameter gas main tubing into larger-diameter gas main while the larger-diameter gas main remained in service were effectively limited to a maximum of around 600 feet (approximately 183 meters). This permitted a gas company performing such a live gas main insertion to insert to a length of one to two city blocks. This range permited the gas company to conduct live gas main insertions, utilizing the equipment described in the aforementioned U.S. patents in about sixty-five percent of gas main replacement situations. However, it has been estimated that a doubling of this range, i.e., to approximately 1200 feet (366 meters) would permit about eighty-five percent of the gas main replacements which are currently being conducted to be conducted as live main insertions utilizing the equipment described in the above-identified patents.

Accordingly, it is an object of the present invention to provide apparatus for use in conjunction with the apparatus described in the two above-identified patents.

It is a further object of the present invention to provide such additional apparatus which will substantially increase the range within which live gas main insertions can be conducted utilizing the equipment of the above-identified patents.

According to the invention, a mechanism for use in insertion of two flexible semirigid members from opposite ends into a length of tube comprises a first carrier, a first coupler member supported by the first carrier, a second carrier and a second coupler member supported by the second carrier for engagement in the length of tube by the first coupler member. Each of the first and second carriers includes means for substantially centering it in the length of tube, and means for attaching a respective one of the lengths of flexible semirigid member to a respective one of the carriers to permit pushing of the flexible semirigid members into the length of tube from opposite ends to move the first and second carriers toward each other. At least one of the first and second coupler members includes means for locking the first and second coupler members together when they are engaged in the tube.

According to an illustrative embodiment, each carrier includes a central shaft, a first spider fixed to the shaft, a second spider movable longitudinally along the shaft, eight legs, each leg having a first end for flexible attachment to one of the spiders and a second end, each of the first and second spiders including means for flexibly attaching four legs to the spider in generally equally peripherally spaced positions around the shaft, to extend radially from, and longitudinally along, the shaft. The second end of each leg flexibly mounted on the first spider is flexibly attached to the second end of a respective leg flexibly mounted on the second spider. Roller means are mounted adjacent the flexible joints of the leg second ends to roll within the length of tube. Means are provided for biasing the second spider toward the first to project the roller means into contact with the tube inner side walls, substantially centering the carrier in the tube.

Illustratively, the biasing means includes a helical compression spring mounted on the shaft and pressed into engagement with the second spider, and a spring stop fixed to the shaft and against which the spring works to urge the second spider toward the first. Further according to the illustrative embodiment, the carrier includes a travel limit stop mounted on the shaft adjacent the flexible connections of the second ends of the legs to limit radially inward travel of the flexible connections toward the shaft and prevent over-center lock-up of the legs as the carrier passes through constricted regions, such as obstructions, within the gas main.

Additionally according to the illustrative embodiment, the means for attaching a respective one of the lengths of the flexible semirigid member to a respective one of the carriers includes a fitting for permitting the length of flexible semirigid member to lie generally against a wall of the length of tube substantially without affecting the self-centering characteristics of its respective carrier within the length of tube. Illustratively, the fitting includes a gooseneck portion and means for pivotally attaching the gooseneck portion to the carrier.

Additionally according to the illustrative embodiment, the first coupler member includes means providing a somewhat conically configured surface, and the second coupler member includes means providing a somewhat funnel-shaped surface for receiving and guiding the conically configured surface. The locking means includes means adjacent the conically configured surface on the first coupler member providing a stop, and means adjacent the funnel-shaped surface on the second coupler member providing a pawl and means for yieldably urging the pawl into engagement with the stop.

Further according to the illustrative embodiment of the invention, a method for joining two flexible semirigid members within a length of tubing comprises the steps of coupling one end of a first one of the flexible semirigid members to a first carrier movable within the length of tubing, coupling one end of the second one of the flexible simirigid members to a second carrier movable in the length of tubing, providing cooperating coupler members on the first and second carriers, moving the first carrier through the length of tubing from a first end toward a second end by pushing on the first of the flexible semirigid members, moving the second carrier through the length of tubing from the second end toward the first end by pushing on the second of the flexible semirigid members, engaging the cooperating coupler means on the first and second carriers and pulling on one of the first and second flexible semirigid members to pull both of the first and second carriers and the other of the first and second semirigid members through the length of tubing.

The invention may best be understood by referring to the following description and accompanying drawings which illustrate the invention.

In the drawings:

FIG. 1 is a diagrammatic partly fragmentary and sectional side elevational view of a live gas main insertion procedure being conducted utilizing the apparatus of the present invention;

FIG. 2 is a partly fragmentary and diagrammatic side elevational view of a modification of a prior art gate box to practice a live gas main insertion technique utilizing the apparatus of the present invention;

FIG. 3 is an enlarged fragmentary and sectional side elevational view of a live gas main insertion procedure illustrating a portion of the apparatus of the present invention; and FIG. 4 is an enlarged perspective view of the apparatus of the instant invention.

Turning now to FIGS. 1-2, during the initial phase of an illustrative live gas main insertion, by-passes 20 with manually operable shut-off valves 22, check valves 24 and recording pressure gauges 26 are installed between a low pressure gas source main 28 and a section 30 of low pressure gas main into which a new, relatively smaller-diameter, higher-pressure main section is to be inserted, and between main section 30 and a downstream main section 33. Each by-pass 20 is of sufficient capacity to provide full low-pressure gas supply to customers' connections 31 in main section 30 and in downstream main section 33. Section 30 may be, for example, three blocks long, and it will be appreciated that several customers may be connected to and serviced by such a main section.

Using conventional techniques and equipment, tapped entries 34, 36 are drilled into the side walls of the gas main intermediate the taps 38 of by-passes 20 into main sections 28, 30, and 33. Inflatable sealing bags 42 (illustrated diagrammatically) are inserted into taps 34, 36 and inflated, sealing a main section (not shown) in region 44 therebetween and preventing the flow of low-pressure gas through main section 44. Additional bag seals 48 (illustrated diagrammatically) are placed into tapped holes 50, 51 in the side walls of main section 30 near its terminal end 52 and the entry end 53 of downstream main section 33. Bag seals 48 are inflated, sealing off main section 30, except through by-passes 20 from the upstream and downstream main sections 28, 33. Main sections are then removed from regions 44 and 54 intermediate bag seals 42 and 48, respectively, and closure caps 56 are placed on the ends of source main 28 and downstream main 33 to close them.

Insertion fittings 60, 62, which are constructed generally as described in U.S. Pat. No. 4,090,534, are installed on the ends 58, 52, respectively, of section 30. Each of fittings 60, 62 is secured to main section 30, and is sealed against gas leakage for subsequent insertion steps.

Two nipple fittings 70 including nipples 72 having small-diameter central circular apertures 74 are provided. Fittings 70 include outer grease chambers 76 having grease fittings 78, seals 80 having central circular apertures with the same diameter as apertures 74, and in registry therewith, inner grease chambers 82 having grease fittings 84, and grease chambers 88 having inside diameters approximately equal to the outside diameter of the smaller-diameter main section to be inserted. Each grease chamber 88 also has at least one grease fitting 90 provided on it.

Fittings 60, 62 are generally as described in considerable detail in U.S. Pat. No. 4,090,534. Each includes a fitting 96 at one of its ends for attaching the fittings 60, 62 to main ends 58, 52, respectively. The fittings 88 at the other end of each of fittings 60, 62 have central circular apertures with diameters approximately equal to the outside diameter of the smaller-diameter main section to be inserted, so that when the new main section is being inserted into fittings 88, a sliding seal is established with the smaller-diameter section through these fittings.

Each fitting 60, 62 includes cylindrical throat sections 102, 104 joined by a box-shaped center section 110. Center sections 110 house gate members or rams, described in U.S. Pat. No. 4,090,534, which can be closed by manipulation of the handles 112 provided on center sections 110 to seal around semirigid flexible rods 114, 116 which are to be inserted into fittings 60, 62, respectively.

A hand manipulable pipeline crawler 120 including a carrier 122, a coupler member 124 and a gooseneck fitting 126 is provided for insertion into end 58 of section 30. A pipeline crawler 130 including a carrier 132, a coupler 134 and a gooseneck fitting 136 is provided for insertion into end 52 of main section 30. These insertions are achieved as follows. Rod 114 is threaded through the nipple 72 associated with fitting 60. The end 140 of rod 114 is then secured to the gooseneck fitting 126 of pipeline crawler 120. Crawler 120 is then placed in the throat 104 of fittings 60. The nipple fitting 70 is then coupled to fitting 60. At the opposite end of section 30, rod 116 is threaded through the nipple 72 associated with fitting 62 and the end 142 of rod 116 is coupled to gooseneck fitting 136 of pipeline crawler 130. Crawler 130 is then placed in throat 104 of fitting 62 and fitting 70 is coupled to fitting 62.

Grease is then pumped through fittings 78 into grease chambers 76 to insure that rods 114, 116 are sealed in the nipples 72.

At this time, the bag seals 42, 48 are deflated or "lifted". The rams or gates of fittings 60, 62 are retracted by manipulation of the handles 112. Rods 114, 116 are pushed through the now-open fittings 60, 62 from opposite ends 58, 52, respectively, of main section 30, into the main section 30 itself. The pushing of rods 114, 116 through nipple fittings 70 continues until the pipeline crawlers 120, 130 both reach approximately the middle of the main section 30. The crawlers 120, 130 are substantially self-centering in main section 30, in a manner which will be described, such that their couplers 124, 134, respectively are carried at approximately the center of the main section 30. As the crawlers 120, 130 reach each other, their couplers 124, 134, respectively are guided into engagement. The now-joined crawlers 120, 130 are pulled in one direction back through the main section 30, illustratively toward end 58 and fitting 60, by pulling on rod 114. This, it will be appreciated, pulls the entire length of rod 116 through the main section 30 so that rod 116 extends from fitting 62 to fitting 60.

After both of pipeline crawlers 120, 130 have been pulled completely through the center section 110 of fitting 60 (and a window can be provided in center section 110 for purposes of determining when this has occurred), the handles 112 associated with the center sections 110 of both of fittings 60, 62 are rotated to project the rams or gates toward each other. The rams close about rod 116 and are sealed against it to prevent gas leakage by soft rubber gaskets carried on the rams. It will be appreciated that the throat 104 of fitting 60 must be made sufficiently long to accommodate the coupled pipeline crawlers 120, 130 during this phase of the live main insertion. This may best be appreciated by referring to FIG. 2 which shows the coupled crawlers 120, 130 in the throat 104 of fitting 60.

At this time, a plastic-coated cable (not shown) having a circular cross-section and a diameter substantially equal to the diameters of rods 114, 116 is inserted through the main section 30 in the manner described in detail in U.S. Pat. No. 4,090,534. As an alternative procedure, once the crawlers 120, 130 are coupled, the plastic coated cable can be attached to an end of either of rods 114, 116 and pulled through main section 30 as the coupled crawlers 120, 130 are pulled toward one end of section 30.

Finally, the section of smaller-diameter main (not shown) is inserted through the larger-diameter, lower-pressure main section 30 in the manner described in detail in U.S. Pat. No. 4,090,534. All of the insertion procedure is conducted without interrupting the supply of gas at low pressure to main section 30. Thus, the entire insertion proceeds without interrupting gas supplies to customers' connections 31.

The construction details of pipeline crawlers 120, 130 will now be discussed with particular reference to FIGS. 3–4. Each crawler 120, 130 includes a central shaft 148 having a spider 150 stationarily positioned along its length. The spiders 150 preferably are held in position by set screws 152. Each shaft 158 also supports a spider 154 which is slidable along the shaft 148, and is urged toward the spider 150 by a helical compression spring 156 positioned on the shaft 148 between the spider 154 and a spring stop 160. Spring stops 160 are positioned along shafts 148 by set screws 162.

Each spider 150, 154 supports four radially and axially projecting legs 166. The legs 166 associated with each spider 150, 154 are substantially equiangularly disposed about their respective spider 150, 154 and are coupled to the spider by pivot pins 170 which flexibly couple one end 172 of each leg 166 to a respective spider 150, 154. Roller support plates 180 are fixed to the remaining ends 182 of the legs 166 associated with spiders 154. Plates 180 are attached to ends 182 in spaced pairs and a roller 186 is mounted on an axle 188 between the plates 180 of each pair. The remaining ends 190 of the legs 166 associated with each spider 150 are pivotally attached to the support plates 180 by pivot pins 192. Articulated joints 194 are thus formed between pairs of legs 166. The articulated joints 194 are urged outwardly radially from the shaft 148 by the pressure exerted by springs 156 on spiders 154. To prevent the articulated joints 194 from "locking up" at their radially innermost positions adjacent shaft 148 as the crawlers 120, 130 are propelled through small-diameter regions in main section 30, or past obstructions in main 30, a travel limit stop 196 is positioned on shaft 148 by a set screw 198 radially inwardly from the innermost travel limit of the articulated joints 194.

It will be appreciated that the use of set screws 152, 162, 198 permits adjustment of the carrier mechanisms 122, 132 to adapt them to main sections 30 of varying diameters. As the main section 30 diameter increases, the spiders 150 and spring stops 160 are moved closer together to provide a greater radially outward deflection of the articulated joints 194.

Turning now to the couplers 124, 134, coupler 124 is a male coupler and coupler 134 is a female coupler. Coupler 124 is mounted on the forwardmost end 200 of shaft 148 of the crawler 120. Coupler 124 is provided with a blunt tip 202, a conical section surface 204, a right circular cylindrical surface 206 and a stop surface 208 which is generally perpendicular to the axis of shaft 148.

Coupler 134 includes a funnel-shaped surface 210 for receiving the coupler 124 and guiding it into an opening 212 in the center of coupler 134. Coupler 134 further includes a box-like portion 216 directly behind the opening 212. As the couplers 124, 134 are moved into engagement, coupler 124 passes through the opening 212 into the box-like portion 216. A pawl-type retainer mechanism 220 is provided on the box-like portion 216 to insure that, once the couplers 124, 134 have been coupled at about the center of the main section 30, both can be pulled toward either of the main section 30 ends 52, 58 without becoming disengaged. Retainer mechanism 220 includes a flap-like retainer 222 which is hinged at 224 to cover approximately half of the opening 212. Flap-like retainer 222 is provided with a projecting arm 226 and a tension spring 230 is attached to arm 226 and to a support 232 provided on the box-like portion 216. As coupler 124 enters the box-like portion 216 through opening 212, the conical section surface 204 deflects the flap-like retainer 222 against the urging of spring 230. After the conical section surface 204 and right circular cylindrical surface 206 have passed into the box-like portion 216, spring 230 urges the retainer 222 toward the shaft 148 of carrier 122 to engage stop surface 208.

A coupler 240 is provided at the rear end 242 of each shaft 148. The coupler 240 is slotted at 244 to accommodate one end of a respective gooseneck fitting 126, 136. The gooseneck fittings 126, 136 are attached to their respective couplers 240 by pivot pins 248. The other ends 250 of both of gooseneck fittings 126, 136 are provided with diametrically extending bores 252 (FIG. 3). Ends 250 are sized for sliding fit into the sleeves 254 mounted on the ends of rods 114, 116. Sleeves 254 are provided with bores which mate with the bores 252. The rods 114, 116 are coupled to the goosenecks 126, 136 by pins which are inserted through the sleeve bores and the bores 252 in the goosenecks 126, 136.

It will be appreciated that the substantial lengths of rods 114, 116 which are required to be pushed through the main section 30 to couple crawlers 120, 130 have considerable weight. If the forward ends of rods 114, 116 were coupled directly to the crawlers 120, 130, along the axes of shafts 148, this weight might cause the axes of shafts 148 to become cocked at odd angles with respect to the axis of main section 30. The gooseneck coupling technique permits the forward ends or rods 114, 116 to ride close to the wall of main section 30 while the couplers 124, 134 ride at approximately the main 30 axis. This avoids the effect of the weight of rods 114, 116 on the ability of the carriers 122, 132 to center their respective couplers 124, 134 substantially along the axis of main section 30. This assists in the manipulation of the pipeline crawlers 120, 130 at the point of coupling. Additionally, this off-center coupling of the rods 114, 116 to the crawlers 120, 130, respectively, enhances the ability of the crawlers 120, 130 to ride in their illustrated orientations throughout the rod insertion process. This avoids any undue twisting, spiralling, or looping of the rods 114, 116 which might otherwise occur, and promotes a "straight" insertion.

It will be appreciated that with the crawlers 120, 130 illustrated, the length of main section 30 within which it is possible to conduct an insertion according to U.S. Pat. Nos. 3,845,789 and 4,090,534 is effectively doubled.

What is claimed is:

1. A coupler mechanism for use in insertion of two lengths of a flexible semirigid member from opposite ends into a length of tube, the coupler mechanism comprising a first carrier, a first coupler member supported by the first carrier, a second carrier, a second coupler member supported by the second carrier for engagement in the length of tube by the first coupler member, each of the first and second carriers including means for substantially centering a respective one of the first and second coupler members in the length of tube, means for attaching a respective one of the lengths of flexible simirigid member to a respective one of the carriers to permit pushing of the flexible semirigid members into the length of tube from the opposite ends to move the first and second carriers toward each other, and at least one of the first and second coupler members including means for locking the first and second coupler members together when they are engaged in the tube.

2. The apparatus of claim 1 wherein each of the semirigid members comprises a long fiberglass rod.

3. The apparatus of claim 1 wherein the length of tube is a length of gas main.

4. The apparatus of claim 3 wherein the length of the gas main is live, the apparatus further including a gate box assembly for attachment to each of the ends to maintain the length of main under gas pressure substantially throughout the insertion.

5. The apparatus of claim 1 wherein at least one of the first and second carriers includes a central shaft, a first spider fixed to the shaft, a second spider movable longitudinally along the shaft, four legs, each leg having a first end for flexible attachment to one of the spiders and a second end, each spider including means for flexibly attaching two legs to the spider, the second end of each leg flexibly attached to the first spider being flexibly attached to the second end of a respective leg flexibly attached to the second spider, roller means mounted adjacent the flexible joints of the leg second ends to roll within the length of tube, and means for biasing the second spider toward the first to project the roller means into contact with the tube inner side walls.

6. The apparatus of claim 5 wherein the biasing means includes a helical compression spring mounted on the shaft and pressed into engagement with the second spider, and a spring stop fixed to the shaft and against which the spring works to urge the second spider toward the first.

7. The apparatus of claim 6 wherein the at least one carrier further includes a travel limit stop mounted on the shaft adjacent the flexible connections of the second ends of the legs to limit travel of the flexible connections toward the shaft.

8. The apparatus of claim 1 wherein the means for attaching a respective one of the lengths of the flexible semirigid member to a respective one of the carriers includes a fitting for permitting the length of flexible semirigid member to lie generally against a wall of the length of tube substantially without affecting the orientation of its respective carrier within the length of tube.

9. The apparatus of claim 8 wherein the fitting includes a gooseneck portion and means for pivotally attaching the gooseneck portion to the carrier.

10. The apparatus of claim 1 wherein the first coupler member includes means providing a somewhat conically configured surface, and the second coupler member includes means providing a somewhat funnel-shaped surface for receiving and guiding the conically configured surface.

11. The apparatus of claim 10 wherein the locking means comprises means adjacent the conically configured surface on the first coupler member providing a stop and means adjacent the funnel-shaped surface on the second coupler member providing a pawl and means for yieldably urging the pawl into engagement with the stop.

12. A method for inserting one of two flexible semirigid members through a length of tube comprising the steps of coupling one end of a first one of the flexible semirigid members to a first carrier movable within the length of tube, coupling one end of the second one of the flexible semirigid members to a second carrier movable in the length of tube, providing cooperating coupler means on the first and second carriers, moving the first carrier through the length of tube from a first end toward a second end by pushing on the first of the flexible semirigid members, moving the second carrier through the length of tube from a second end toward the first end by pushing on the second of the flexible semirigid members, engaging the cooperating coupler means on the first and second carriers, and pulling on one of the first and second flexible semirigid members to pull both of the first and second carriers and the other of the first and second flexible semirigid members through the length of tube.

13. The method of claim 12 wherein the first and second carriers are generally self-centering in the length of tube.

* * * * *